United States Patent Office 3,251,890
Patented May 17, 1966

3,251,890
PRODUCTION OF HEXAFLUOROBENZENE
Robert Neville Haszeldine, "Windyridge," Lyme Road, Disley, England, and John Michael Birchall, Flat 3, 77 Palatine Road, Withington, Manchester 20, England
No Drawing. Filed Oct. 30, 1961, Ser. No. 149,818
Claims priority, application Great Britain, Nov. 17, 1959, 38,961/59
4 Claims. (Cl. 260—650)

This application is a continuation-in-part of our copending application Serial No. 37,842, filed June 22, 1960, now abandoned.

This invention relates to a new chemical process and in particular to a new process for the preparation of hexafluorobenzene.

Hexafluorobenzene is of great interest in organic fluorine chemistry as it is analogous to benzene in classical aromatic organic chemistry. It is valuable as an intermediate in the preparation of pharmaceutical compounds and of polymers, such as the polyethers derived from pentafluorophenol which have excellent thermal and chemical stability, and the polyesters of the perfluorophthalic acids, especially the fluorine analogues of compounds important as raw materials for the production of artificial fibers.

It can also be converted to potassium pentafluorophenate, $C_6F_5OK$ by treatment with caustic potash in tert-butanol. This compound, which is a powerful fungicide, can be reacted with hexafluorobenzene to form the halogenated diphenyl ethers $C_6F_5 \cdot O \cdot C_6F_5$ and $$C_6F_5 \cdot O \cdot C_6F_4 \cdot O \cdot C_6F_5$$

which are useful as heat exchange media and transformer oils.

Hitherto the most favorable method preparing hexafluorobenzene has involved either (a) the reaction of benzene with cobalt trifluoride to give $C_6F_9H_3$ which compound is then subjected to dehydrofluorination or (b) the pyrolysis of fluorotribromomethane according to the reaction $6CFBr_3 \rightarrow C_6F_6 + 9Br_2$. Method (a) is tedious and expensive and the yields are low. Method (b), while giving satisfactory yields, involves the liberation of a large amount of bromine which must be recovered. There is, therefore, a need for an improved route to hexafluorobenzene.

It has now been discovered that hexafluorobenzene can be prepared in a more economical manner by a method which involves the pyrolysis of trifluoroethylene, 1,2-difluorochloroethylene, 1,2-difluorobromoethylene, or dichlorofluoromethane. The first three pyrolysis reactions can be represented as follows:

$$3CHF:CFX \rightarrow C_6F_6 + 3HX$$

where X is fluorine, chlorine, or bromine, but preferably chlorine or bromine.

The course of the pyrolysis of dichlorofluoromethane to form $C_6F_6$ is not fully known. However, it is considered possible that $CHFCl_2$ undergoes coupling to form $CHFCl—CHFCl$ which then loses HCl to form $CHF=CFCl$. In the production of $C_6F_6$ from the last compound, perfluoroacetylene, $C_2F_2$, may be an intermediate.

The invention thus comprises a method for the preparation of perfluorobenzene which comprises subjecting a compound selected from the group consisting of dichlorofluoromethane and compounds having the general formula $$CHF=CFX$$

where X is selected from the group consisting of fluorine, chlorine and bromine, to pyrolysis.

That the pyrolysis reactions which are the subject of the present invention could be carried out was wholly surprising in that it was to be expected that pyrolysis of a fluoro- or fluorochloro olefin would yield either a cyclobutane, or an acyclic compound, likely a dimer, trimer or tetramer. Thus, for example, it is well known that the pyrolysis of $CF_2:CFCl$ yields either the cyclobutane

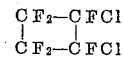

or the dimer $CF_2Cl \cdot CFCl \cdot CF:CF_2$. Again, the fluorochloro olefin $CFCl=CFCl$ on pyrolysis gives a linear dimer, trimer or tetramer. Yet again, perfluoroethylene when pyrolysed at 200° C. yields perfluorocyclobutane and at 500° C. gives perfluoroisobutylene and also perfluoropropene.

One way of conducting the pyrolysis reaction is to pass a vapor stream of the starting compound through a heated tube in the absence of moisture, air or oxygen. An inert diluent gas such as nitrogen may be used with the vapor. The products of the reaction are then condensed in cooled traps and hexafluorobenzene is recovered by distillation, vapor phase chromatography or other conventional purification techniques.

Alternatively a batch technique may be used as by heating the starting material in an autoclave.

The pyrolysis reactions of the invention can be carried out using either batch or flow techniques at temperatures ranging from about 400 to about 1000° C. Pressures are not critical and may range from 0.001 to 1000 atmospheres, absolute. Reaction times may be from say one second to several hours.

When the starting material is an ethylene of the class defined the temperature is normally in the range from 400 to 800° C., preferably from 500 to 700° C. The pressure may be normally from say 0.001 to 100 atmospheres and the reaction time from 0.4 minute to one hour.

When the starting material is dichlorofluoromethane the temperature is normally from say 450° C. to 1000° C., preferably from 550° C. to 800° C. for a flow process and 450° C. to 900° C. for a batch process. The pressure is normally from say 0.01 atmosphere to 1000 atmospheres, preferably 0.1 to 100 atmospheres. Contact time is on the order of 1 second to 10 minutes, preferably 10 seconds to 5 minutes for a flow process or 15 to say 200 minutes for a batch process. The reaction is preferably carried out in apparatus constructed of inert material, e.g. platinum or carbon, although nickel or stainless steel can be used, particularly for 1,2-difluorochloroethylene and 1,2-difluorobroethylene. In repeated experiments involving the pyrolysis of these compounds in a platinum-lined nickel tube no attack on the platinum or the occurrence of carbonisation has been observed. In the pyrolysis of dichlorofluoromethane any of the above materials, monel, inconel or even iron may be used.

For any particular pyrolysis apparatus, using a flow technique, optimum yields of hexafluorobenzene may be secured by appropriate correlation of the factors of the flow rate, temperature and pressure. Appropriate correlation of these factors may, of course, be readily achieved by a few routine tests and satisfactory yields of hexafluorobenzene thereby obtained.

Apart from the fact that satisfactory yields of hexafluorobenzene can be obtained in the pyrolysis reaction of the invention, another advantage of the method resides in the use as starting materials, of the simple halogenated methane $CHFCl_2$ and ethylenes, $CHF=CFCl$ and $CHF=CFBr$, which can be readily prepared. Thus, for example, the aforementioned ethylene may be prepared by any of the methods represented below.

1(a) 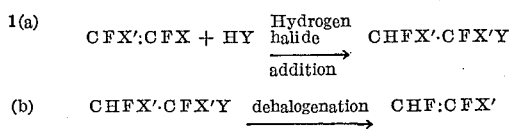

(b) $CHFX' \cdot CFX'Y \xrightarrow{\text{dehalogenation}} CHF{:}CFX'$ where, in the above formula, when X' represents chlorine, Y represents chlorine or bromine and when X' represents bromine, Y also represents bromine. The hydrogen halide addition step in the above synthesis may be carried out at a temperature in the range from 20–250° C. and a pressure in the range from 1–100 atmospheres. Ultraviolet light is often a convenient means for facilitating the addition of HBr to the olefin. The dehalogenation step may be carried out at a temperature in the range from 20–100° C. and a pressure in the range from 1–100 atmospheres in the presence of a halogen acceptor such as zinc, iron, magnesium or sodium amalgam. Preferably, a dehalogenation reaction is carried out in the presence of a solvent, e.g. an alcohol such as ethanol.

2(a) $CFX'' \cdot CFX'' \xrightarrow{\text{hydrogenation}} CHFX'' \cdot CHFX''$ where both X″ atoms are either chlorine or bromine. Such a hydrogenation reaction may, for example, be carried out in an autoclave at a temperature in the range from 20–200° C. under a pressure in the range from 5–100 atmospheres and in the presence of a hologenation catalyst.

(b) $CHFX'' \cdot CHFX'' \xrightarrow{\text{dehydrohalogenation}} CFX''{=}CHF$ such a dehydrohalogenation can be effected by use of an alcoholic alkali such as ethanolic KOH, or by use of a tertiary organic base such as quinoline.

3(a) 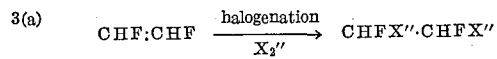

(b) 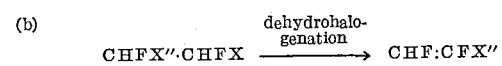

where X″ is chlorine or bromine.

The halogenation step in the above synthesis can be carried out by heating the reactants together at temperatures in the range from 20–150° C. and pressures in the range from 1–50 atmospheres with or without the use of ultraviolet light to facilitate the addition reaction.

The dehydrohalogenation step can be carried out in a similar manner to that described for the similar process in 2(b) above.

The particularly preferred halogenated ethylene which is subjected to pyrolysis is the compound CHF:CFCl since this can be easily prepared from the commercially available compound CFCl:CFCl. The compound CHF:CFBr is expensive, while the compound $CHF{=}CF_2$ requires a more expensive material of construction for the pyrolysis apparatus since it gives rise to hydrogen fluoride during the pyrolysis.

In the pyrolysis of the halogenated methane it may be desirable to conduct the reaction in the presence of a metallic halogen acceptor, for example, iron, nickel or cobalt, preferably in a subdivided state.

The invention illustrated by the following examples which are intended only for purposes of illustration and are not intended as in any way limiting the invention beyond the scope of the appended claims.

*Example 1*

(a) Irradiation of a mixture of 50 g. of 1,2-dichlorodifluoroethylene, $CFCl{=}CFCl$, and 31 g. of hydrogen bromide with radiation from a 500 watt mercury discharge tube for one hour, gives on condensation and distillation of the products, 75 g. of a fraction boiling in the temperature range 97.5–98.5° C. which is identified as bromo-1,2-dichloro-1,2-difluoroethane CHFCl—CFClBr.

(b) 72 g. of this compound are gradually introduced into a well-stirred mixture of a large excess of activated zinc dust (160 g.) and ethanol (110 ml.). The reaction proceeds smoothly and on condensation and distillation of the volatile product, 31 g. of a fraction boiling in the temperature range —15° C. to —12° C. are obtained and this is identified as chloro-1,2-difluoroethylene.

(c) The pyrolysis of this compound CHF=CFCl, is then carried out to give hexafluorobenzene. 28 g. of chloro-1,2-difluoroethylene are passed through platinum-lined nickel tube maintained at 650° C., at such a rate that the contact time with the tube is 0.4 minute. The products are condensed in cooled traps and distilled to give a number of fractions including one boiling in the temperature range 87.5–81.1° C., in which the presence of hexafluorobenzene was detected by infra-red spectroscopy. Gas-liquid chromatography indicates that this compound is the major component of the fraction. A yield of 6.7% is estimated.

A series of pyrolysis experiments are carried out under similar conditions to those in (c) above but with different reaction variables. The results of these experiments are tabulated below.

| Wt. of $C_2HClF_2$ Pyrolysed, g. | Temperature, °C. | Contact time, min. | Conversion, percent | Chromatographic Estimation of Yield ($C_6F_6$), percent |
|---|---|---|---|---|
| 28.0 | 650 | 0.4 | 35 | 6–7 |
| 34.6 | 620 | 1.1 | 55 | 7–8 |
| 20.0 | 590 | 2.3 | 56 | 14.2 |
| 19.4 | 600 | 2.3 | 61 | 17.2 |
| 17.6 | 620 | 2.3 | 71 | 10.6 |
| 94.0 | 600 | 2.3 | 62 | |
| 32.0 | 600 | 2.3 | 61 | 13.6 |

*Example 2*

Bromo-1,2-difluoroethylene, CHF=CFBr, is pyrolysed under conditions similar to those used for chloro-1,2-difluoroethylene, CHF=CFCl, in Example 1. Hexafluorobenzene is produced in satisfactory yield.

*Example 3*

Dichlorofluoromethane (78.3 g.), in an atmosphere of nitrogen, is passed at a rate of 2.7 g./hr. through a cylindrical platinum tube (1.0 cm. diameter; 55.5 cm. heated length), heated at 700° in an electric furnace. The products are collected at —72° and —196°, and are distilled in an apparatus for manipulation of volatile compounds to give fractions condensing at —66° (22.0 g.), —95° (28.8 g.), —130° (5.1 g.) and —196° (15.9 g.). The fractions condensing at —95° and —130° are shown by infrared spectroscopy to contain 1,2-dichlorodifluoroethylene and unchanged dichlorofluoromethane, and the fraction condensinge at —196° is similary shown to be hydrogen chloride (found: M, 37). The fraction condensing at —66° is distilled through a 30 cm. Podbielniak column and gives a fraction boiling at 81–91° (6.05 g.), which was shown by gas-liquid chromatogaraphy and infrared spectroscopy to contain hexafluorobenzene (1.5 g.; 6% yield).

We claim:

1. A method for making hexafluorobenzene which comprises pyrolysing a compound selected from the group consisting of dichlorofluoromethane and halogenated ethylenes having the general formula $$CHF{=}CFX$$

where X is selected from the group consisting of fluorine, chlorine and bromine at a temperature between about 590° C. and about 1000° C. and for a time between about ten seconds and several hours.

2. The method claimed in claim 1 wherein the pyrolysis is carried out by passing the compound, admixed with an inert diluent gas, through a heated tube.

3. The method claimed in claim 1 wherein the process is carried out as a batch process.

4. The method claimed in claim 1 wherein the compound is a halogenated ethylene and the pyrolysis is carried out at a temperature between about 590° C. and about 650° C. for a time between about 0.4 minute and about 1 hour.

References Cited by the Examiner

UNITED STATES PATENTS

| 2,551,573 | 5/1951 | Downing et al. | 260—653 |
| 2,927,138 | 3/1960 | Wall et al. | 260—650 |

FOREIGN PATENTS

| 23,780 | 10/1906 | Great Britain. |
| 581,405 | 10/1946 | Great Britain. |

OTHER REFERENCES

Lob, "Zeitschrift fer Elektrochemie," Vol. 7 (1901), pp. 903–21, pp. 908–10 and 916–8 only needed.

Nicodemus, "Jour. fur Praktische Chemie" (2), Vol. 83 (1911), pp. 312–22.

LEON ZITVER, *Primary Examiner.*

ALPHONSO D. SULLIVAN, *Examiner.*